Oct. 25, 1932.  J. T. ATWOOD  1,884,505
DOOR BUMPER
Filed Sept. 11, 1931
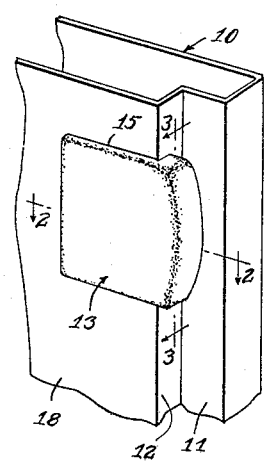
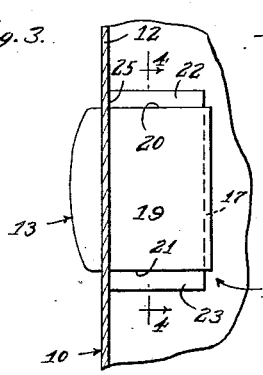
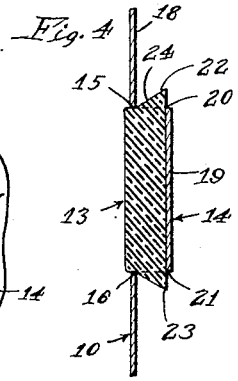
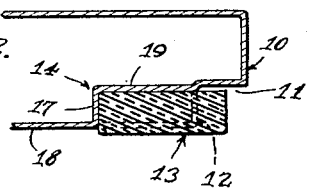
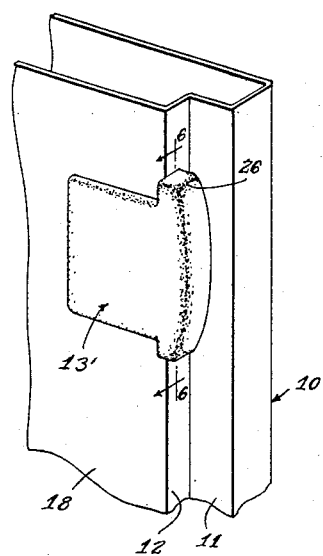
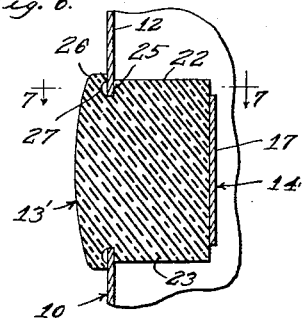
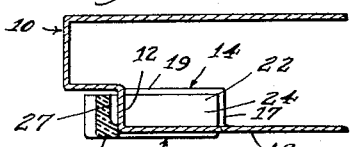

Patented Oct. 25, 1932

1,884,505

UNITED STATES PATENT OFFICE

JAMES T. ATWOOD, OF ROCKFORD, ILLINOIS

DOOR BUMPER

Application filed September 11, 1931. Serial No. 562,273.

This invention relates to bumpers for automobile doors, for cushioning the closing of the doors, as well as preventing rattling thereof in closed position.

When automobile body frames were of wooden construction, bumpers could be fastened in place thereon satisfactorily by means of a stamped sheet metal retainer fastened in a socket cut therefor in the frame, as illustrated in Atwood Patents #1,523,627 and #1,535,446. The change to steel frame construction, or steel covered frame construction brought with it the problem as to how to fasten the bumpers satisfactorily under these conditions. It is, therefore, the principal object of my invention to provide a bumper of resilient material, generally similar to those used heretofore, but having the retainer therefor formed directly in the steel frame.

In the mounting of a bumper in a hole provided therefor in a steel pillar, it is a problem to provide ample support for the bumper to withstand compression. It is accordingly another object of my invention to form the retainer in the pillar in such a way that a wall is provided to back up the bumper and provide the proper support therefor.

Another object is to provide a bumper of such form that although it is easy to insert in its hole in the pillar, it is positively held against accidental disengagement.

The invention is illustrated in the accompanying drawing, in which—

Figure 1 is a perspective view showing a door jamb on a steel pillar equipped with a bumper embodying my invention;

Fig. 2 is a horizontal section on the line 2—2 of Figure 1;

Fig. 3 is a vertical section on the line 3—3 of Figure 1;

Fig. 4 is a cross-section on the line 4—4 of Fig. 3;

Fig. 5 is a view similar to Figure 1 showing a modification;

Fig. 6 is a vertical section on the line 6—6 of Fig. 5, and

Fig. 7 is a horizontal section on the line 7—7 of Fig. 6.

Similar reference numerals are applied to corresponding parts throughout the views.

I have illustrated the invention as applied to an automobile frame of steel construction, but it will soon appear that the invention is equally adapted to frames of combined steel and wood construction. The steel pillar shown at 10 is rabbetted, as indicated at 11, to provide the door jamb 12 offset inwardly from the plane of the outside of the body for reception of the complementarily formed edge of the door arranged to strike the bumper, indicated generally by the reference numeral 13. The socket or retainer for the bumper is, in accordance with the present invention, formed directly in the frame, as indicated at 14, thus making the same adaptable with equal facility to frames of steel construction or steel and wood construction as should be evident. In a frame of wood and steel construction, the wood is, of course, simply routed out to make room for the retainers and the bumpers received therein, as will soon appear.

The pillar 10 has the retainer 14 formed therein by cutting the same horizontally at 15 and 16 rearwardly from the door jamb 12 and crosswise of the door jamb, and subjecting the pillar to a stamping operation so as to form the retainer on the inside of the pillar defined by a back wall 17 at right angles to the side wall 18 of the pillar, and a retainer side wall 19 parallel with the side wall of the pillar. The retainer is, of course, open at the top and bottom thereof inside the pillar, as appears at 20 and 21. This is taken advantage of in the holding of the bumper, as best appears in Figs. 3 and 4, where it will be observed that the bumper has top and bottom projections 22 and 23 to extend through the openings 20 and 21, respectively. The projections 22 and 23 have inclined outer side faces 24 which are arranged to cooperate with the inside of the side wall 18, as clearly appears in Fig. 4, to prevent displacement of the bumper sidewise from the retainer. The front end 25 of each of these projections serves by abutment with the inside of the wall forming the door jamb 12 to prevent displacement forwardly, as for example, if the bumper tends to stick to the door when the door is opened. The front end of the bumper projects from the retainer far enough to keep the door from slamming against the door jamb. It also projects from the side of the pillar to prevent metal to metal contact between the door and the side of the pillar. It is obvious that the full length of the bumper is free to be compressed by contact therewith of the door, the bumper being backed up for such compression by the wall 17 in a fore and aft direction and by the wall 19 in a lateral direction.

In the application of the bumper, it is found that there is very little difficulty in entering the same in the retainer, either end being entered first and the bumper being then compressed endwise and buckled slightly enough to make it possible to force the other end into the retainer, whereupon the bumper immediately expands and is securely anchored in place. The inclination of the side faces 24 of the end projections 22 and 23 greatly facilitates matters in entering the bumper in the retainer, because it makes it unnecessary to compress and buckle the bumper to such an extent as would be necessary otherwise, and once the inner edge of the projection is gotten into the retainer, the inclination of the side face makes it an easy matter to get the bumper all the way in. The inclination of the side face, in other words, gives the bumper the tendency to go in rather than come out, and resist coming out to a greater degree the farther the bumper is withdrawn. The bumper is obviously of simple and economical construction and is one that is thoroughly practical and will give good service.

In Figs. 5–7 I have illustrated a slight modification. The bumper 13' is the same in all respects as the bumper 13 with the only exception that the front end has projections 26 at the top and bottom for abutment on the outside of the wall forming the door jamb 12. The pillar 10 has the same retainer 14 formed therein as in the other case, and the bumper has the same top and bottom projections 22 and 23, respectively, with inclined outer side faces 24. The thought in providing the projections 26 is to give a wider stop for abutment by the door, and also make for better appearance from the standpoint that the opening in the door jamb at the retainer is completely concealed from view in looking at the bumper from in front. In order to allow for compression, the projections 26 are preferably undercut on the back, as indicated at 27.

I claim:

1. In a door pillar, comprising a hollow metallic frame member formed to provide a door jamb having a front and a side wall, and a bumper socket provided in said frame member opening partly from the front and partly from the side wall of said jamb, said socket being open at its upper and lower ends for communication inside the frame member, the socket being defined by a back wall and a side wall within the frame member substantially parallel respectively with the front and side walls of the door jamb, a bumper of resilient material comprising a body arranged to fit in the socket and project forwardly therefrom from the door jamb, the body of said bumper being in abutment with the back and side walls of the socket to support the bumper for compression lengthwise and transversely thereof, and top and bottom projections on said body arranged to project through the open upper and lower ends of the socket on the inside of the frame member for abutment with the inside of the front and side walls of the door jamb, the outer side face of each of said projections being inclined in inwardly diverging relation to one another for the purpose described.

2. The construction as described in claim 1 including top and bottom projections on the front end of the body of said bumper to overlap the outside of the front wall of said door jamb, whereby to conceal the socket and leave only the bumper exposed to view.

3. The construction as described in claim 1 including top and bottom projections on the front end of the body of said bumper to overlap the outside of the front wall of said door jamb, whereby to conceal the socket and leave only the bumper exposed to view, the backs of said projections being undercut so as to allow for easier compression thereof.

4. The construction as described in claim 1 including top and bottom projections on the front end of the body of said bumper to overlap the outside of the front wall of said door jamb, whereby to conceal the socket and leave only the bumper exposed to view, the said projections being undercut just above and below the socket so as to allow for compression of the bumper body as a whole as well as easier compression of said projections.

5. In a door pillar, comprising a door jamb having a front and a side wall, and a retainer socket for a bumper open partly from the front wall and partly from the side wall, the upper and lower ends of said socket being open for communication inside the front and side walls, a bumper of resilient material arranged to be entered in the socket, the bumper comprising a body having top and bottom projections adapted for entry in the open ends of said socket and abutment with the inside of the front and side walls so as to retain the bumper in the socket, the outer side faces of said projections being inclined in inwardly diverging relation to one another for the purpose described.

6. A structure as set forth in claim 5 including a flange formation on the body of the bumper for abutment with the outside of the door jamb to conceal the socket and leave only the bumper exposed to view.

7. A structure as set forth in claim 5 including a flange formation on the body of the bumper for abutment with the outside of the door jamb to conceal the socket and leave only the bumper exposed to view, the back of the flange formation being undercut to allow for easier compression thereof.

8. A structure as set forth in claim 5 including a flange formation on the body for abutment with the outside of the door jamb to conceal the socket and leave only the bumper exposed to view, the back of the flange formation being undercut just above and below the socket so as to allow for easier compression of the bumper body as a whole as well as of the flange formation.

9. In a door pillar, comprising a hollow metallic frame member formed to provide a door jamb having a front and a side wall, and a bumper socket provided in said frame member opening partly from the front and partly from the side wall of said jamb, said socket being open at its upper and lower ends for communication inside the frame member, the socket being defined by a back wall and a side wall within the frame member substantially parallel respectively with the front and side walls of the door jamb, a bumper of resilient material comprising a body arranged to fit in the socket and project forwardly therefrom from the door jamb, the body of said bumper being in abutment with the back and side walls of the socket to support the bumper for compression lengthwise and transversely thereof, and top and bottom projections on said body arranged to project from the upper and lower ends of the socket on the inside of the frame member for abutment with the inside of the front and side walls of the door jamb, at least one of said projections having the outer side face inclined inwardly for the purpose described.

10. In a door pillar, comprising a door jamb having a front and a side wall, and a retainer socket for a bumper open partly from the front wall and partly from the side wall, the upper and lower ends of the socket being open for communication with the inside of the front and side walls, a bumper of resilient material arranged to be entered in the socket, the bumper comprising a body having top and bottom projections adapted for entry in the upper ends of said socket and abutment with the inside of the front and side walls so as to retain the bumper in the socket, at least one of said projections having the outer side face inclined inwardly for the purpose described.

11. A door bumper adapted to be placed in an opening in a door pillar and to project from said opening for engagement with a door, said bumper comprising a body portion of resilient material of a size to fit in the opening, and one or more retaining portions projecting from the edge of the body portion for engagement with the inside of the door pillar adjacent the opening therein, said retaining portions being of resilient material like the body portion and adapted to be flexed to enter the opening with the body portion, the front face of said retaining portions being formed with an inclination extending outwardly from the edge of the body portion, whereby to facilitate entry of the bumper in the opening and still serve to retain the bumper block in place on the pillar.

12. A door bumper adapted to be placed in an opening in a door pillar and to project from said opening for engagement with a door, said bumper comprising a body portion of resilient material of a size to fit in the opening, and retaining portions projecting from the edge of the body portion at diametrically opposite sides thereof for engagement with the inside of the door pillar adjacent the opening therein, said retaining portions being of resilient material like the body portion and adapted to be flexed to enter the opening with the body portion, the front face of said retaining portions being formed with an inclination extending outwardly from the edges of the body portion in inwardly diverging relation to one another, whereby to facilitate entry of the bumper in the opening and still serve to retain the bumper block in place on the pillar.

In witness of the foregoing I affix my signature.

JAMES T. ATWOOD.